UNITED STATES PATENT OFFICE.

LOUIS P. COBLENTZ, OF MIDDLETOWN, MARYLAND.

MANUFACTURE OF PEACH CIDER OR WINE.

SPECIFICATION forming part of Letters Patent No. 248,711, dated October 25, 1881.

Application filed May 3, 1881. (No specimens.)

*To all whom it may concern:*

Be it known that I, LOUIS P. COBLENTZ, of Middletown, in the county of Frederick and State of Maryland, have invented a new and useful Improvement in the Manufacture of Peach Cider or Wine; and I do hereby declare that the following is a full, clear, and exact description of the same.

My invention relates to the manufacture of a fermented beverage from the juice of the peach; and it consists in a process hereinafter fully described.

In carrying my invention into effect I first remove the seeds from the peaches and then grind the fruit in any ordinary cider-mill or crush it by any suitable means. The fruit thus ground or crushed I allow to stand about twelve (12) hours, more or less, according to the temperature, in order to produce a proper degree of fermentation, and then press it in an ordinary cider press, cage, or through cloths. The juice thus expressed is then taken to a wine-cellar, and from one to two pounds of sugar is added for each gallon of the juice. The amount of sugar must be varied according to the nature of the fruit, very sweet peaches needing less and acid ones more. With reasonably sweet peaches, such as many of the early varieties, sugar sufficient to cause the hydrometer (Tralle's) to stand at 35°, or about one pound to the gallon, produces a very good wine; but to make a very sweet wine more must be used, preferably double that amount, or about two pounds. It is better, also, to add honey in order to start the fermentation, for which purpose one-fourth ($\frac{1}{4}$) of a pound to each gallon of the juice is sufficient. If the honey is used in the comb, it may be added to the crushed or ground peaches before pressing; but clear honey may be added with the sugar. After the sugar has been added the whole is thoroughly stirred to bring it to an even grade, and then run into a cask to ferment, during which time it is absolutely essential that it should be excluded from the air. This is done by connecting a flexible tube to the bung and submerging the open end in a vessel of water, whereby the gases are discharged from the barrel without admitting the air.

This process for the peach-juice thus prepared requires three or four months. It is then racked off and bottled or barreled perfectly tight.

I am aware that it is not new to make a wine from juices of various berries and fruits, including peaches, by a process of fermenting the juice, water being mixed with it, and I do not broadly claim such process or product.

I am also aware that honey has been used with such juices.

I am aware, also, that it is not new to crush out the juice of fruits after removing the stones, ferment the mass, and then express the juice, and afterward ferment it in open vessels, and I do not broadly claim this invention, my claim being limited to the additional element which I have found essential to the juice of peaches, which is, that after the above-described process fermentation shall be carried on for the length of time specified in a closed vessel, the gases being carried off under water or in some equivalent way.

Having thus described my invention, what I claim is—

The described process of making a peach wine or cider, consisting in first grinding or crushing the fruit freed from the seeds, then fermenting the fruit thus ground or crushed twelve hours, more or less, and afterward expressing the juice therefrom, subsequently adding sugar or sugar and honey and fermenting three or four months, more or less, without access of air, all substantially as described.

In testimony whereof I have signed my name to this specification in the presence of two subscribing witnesses.

LOUIS P. COBLENTZ.

Witnesses:
F. L. MIDDLETON,
R. F. BARNES.